(12) United States Patent
Debevec et al.

(10) Patent No.: US 8,902,232 B2
(45) Date of Patent: Dec. 2, 2014

(54) FACIAL PERFORMANCE SYNTHESIS USING DEFORMATION DRIVEN POLYNOMIAL DISPLACEMENT MAPS

(75) Inventors: Paul E. Debevec, Marina del Rey, CA (US); Wan-Chun Ma, Taipei (TW); Timothy Hawkins, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 895 days.

(21) Appl. No.: 12/364,284

(22) Filed: Feb. 2, 2009

(65) Prior Publication Data
US 2009/0195545 A1    Aug. 6, 2009

Related U.S. Application Data

(60) Provisional application No. 61/025,173, filed on Jan. 31, 2008.

(51) Int. Cl.
*G06T 15/00* (2011.01)
*G06T 13/40* (2011.01)

(52) U.S. Cl.
CPC ....... *G06T 13/40* (2013.01); *G06T 2207/30196* (2013.01)
USPC ........... 345/473; 345/423; 345/426; 345/646; 345/474; 345/475

(58) Field of Classification Search
CPC .............................................. G06T 2207/30196
USPC .................. 345/423, 426, 646, 473, 474, 475
See application file for complete search history.

(56) References Cited

U.S. PATENT DOCUMENTS

| | | | |
|---|---|---|---|
| 7,652,670 B2 * | 1/2010 | Styles | 345/473 |
| 7,864,181 B1 * | 1/2011 | Baraff | 345/475 |
| 2007/0182744 A1 | 8/2007 | Styles | |
| 2007/0247465 A1 | 10/2007 | Hadap | |
| 2008/0304081 A1 | 12/2008 | Debevec | |

FOREIGN PATENT DOCUMENTS

WO    WO2007/127743 A2    11/2007

OTHER PUBLICATIONS

Cohen et al, Emotion Recognition from Facial Expressions using Multilevel HMM, The University of Illinois at Urbana-Champaign, pp. 1-7, Dec. 2000.*

(Continued)

*Primary Examiner* — Phu K Nguyen
(74) *Attorney, Agent, or Firm* — McDermott Will & Emery LLP

(57) ABSTRACT

Acquisition, modeling, compression, and synthesis of realistic facial deformations using polynomial displacement maps are described. An analysis phase can be included where the relationship between motion capture markers and detailed facial geometry is inferred. A synthesis phase can be included where detailed animated facial geometry is driven by a sparse set of motion capture markers. For analysis, an actor can be recorded wearing facial markers while performing a set of training expression clips. Real-time high-resolution facial deformations are captured, including dynamic wrinkle and pore detail, using interleaved structured light 3D scanning and photometric stereo. Next, displacements are calculated between a neutral mesh driven by the motion capture markers and the high-resolution captured expressions. These geometric displacements are stored in one or more polynomial displacement maps parameterized according to the local deformations of the motion capture dots. For synthesis, the polynomial displacement maps can be driven with new motion capture data.

38 Claims, 8 Drawing Sheets

(56) References Cited

OTHER PUBLICATIONS

Bickel et al. Multi-scale capture of facial geometry and motion. ACM Transactions on Graphics, vol. 26, No. 3, Article 33, Jul. 2007, pp. 33:1-33:10.

Brox et al. High accuracy optical flow estimation based on a theory for warping. In Proc. of the 8th European Conference on Computer Vision, Springer-Verlag, Prague, Czech Republic, Matas (Eds.), vol. 4, May 2004, pp. 25-36.

Guenter, B., Grimm, C., Wood, D., Malvar, 14., and Pighin, F. 1998. Making faces. In Proceedings of SIGGRAPH 98, Computer Graphics Proceedings, Annual Conference Series, 55-66.

Ma et al. Rapid acquisition of specular and diffuse normal maps from polarized spherical gradient illumination. In Rendering Techniques 2007, pp. 183-194.

International Search Report for PCT Application Serial No. PCT/US09/32863, mailed on Jun. 5, 2009.

* cited by examiner (a)

(b)

(c)

(d)

(e)

FACIAL PERFORMANCE SYNTHESIS USING DEFORMATION DRIVEN POLYNOMIAL DISPLACEMENT MAPS

RELATED APPLICATION

This application claims the benefit of U.S. Provisional Patent Application No. 61/025,173, entitled "Facial Performance Synthesis Using Deformation-Driven Polynomial Displacement Maps," filed 31 Jan. 2008, the entire contents of which are incorporated herein by reference.

STATEMENT REGARDING FEDERALLY FUNDED RESEARCH

This invention was made with government support under Contract No. W911NF-04-D0005 awarded by the Army Research Office. The government has certain rights in the invention.

BACKGROUND

The appearance and expressiveness of facial performances are greatly influenced by complex deformations of the face at several scales. Large-scale deformations are driven by muscles and determine the overall shape of the face. Medium-scale deformations are mainly caused by skin wrinkling, and produce many of the expressive qualities in facial expressions. Finally, at the skin mesostructure there is fine-scale stretching and compression which produces subtle but perceptually significant cues. This complex behavior is challenging to reproduce in virtual characters with any combination of artistry and simulation.

Currently, creating realistic virtual faces often involves capturing textures, geometry, and facial motion of real people. It has proven, however, to be difficult to capture and represent facial dynamics accurately at all scales. Face scanning systems can acquire high-resolution facial textures and geometry, but typically only for static poses. Motion capture techniques record continuous facial motion, but only at a coarse level of detail. Straightforward techniques of driving high-resolution character models by relatively coarse motion capture data often fail to produce realistic motion at medium and fine scales. This limitation has motivated techniques such as wrinkle maps, blend shapes, and real-time 3D scanning. However, these prior art methods either fail to reproduce the non-linear nature of skin deformation, are labor-intensive, or do not capture and represent all scales of skin deformation faithfully.

Several prior art real-time 3D scanning systems/methods exist that are able to capture dynamic facial performances. These systems/methods either rely on structured light, use photometric stereo, or a combination of both. These prior art systems/methods are not suited for acquiring data for facial deformation syntheses, either because they do not attain the necessary acquisition rate to capture the temporal deformations faithfully, or they are too data-intensive, or they do not provide sufficient resolution to model facial details.

Modeling and capturing fine wrinkle details is a challenging problem for which a number of specialized prior art acquisition and modeling techniques have been developed. For instance, while some prior art techniques have modeled static pore detail using texture synthesis these techniques can be suitable to enhance static geometry, but they do not model wrinkle or pore deformations over time. Some other prior art techniques have demonstrated how linear interpolation of artist-modeled wrinkle maps can be used for real-time rendering. These techniques, however, model wrinkle and pore detail either statistically or artistically, making the creation of an exact replica of a subject's skin detail difficult.

A different prior art approach has been to model skin detail by measuring it from live subjects. Some prior art techniques have relied on normal maps to model skin meso-structure, captured using photometric stereo from few static expressions. Dynamic normal variation in skin meso-structure for intermediate facial poses can obtained using trilinear interpolation. Certain prior art techniques record dynamic facial wrinkle behavior from motion capture and video of an actor. A pattern of colored makeup is employed to improve shape-from-shading to detect wrinkle indentations in these regions. A non-linear thin shell model can be used to recreate the buckling of skin surrounding each wrinkle. While these systems estimate realistic facial geometry, they are mostly limited to larger scale wrinkles, and rely on (a form of) linear data interpolation to generate intermediate expressions.

Performance capture techniques use the recorded motion of an actor to drive a performance of a virtual character, most often from a set of tracked motion capture markers attached to the actor's face. Mapping the set of tracked markers to character animation controls is a complex but well-studied problem. Prior art techniques have introduced linear expression blending models. Blend shapes have become an established method for animating geometric deformation, and can be either defined by an artist or estimated automatically. Several techniques have used blend shapes to simulate detailed facial performances by linearly interpolating between a set of images or geometric exemplars with different facial expressions. A drawback of this approach is that it can be difficult to use linear blend shapes to reproduce the highly non-linear nature of skin deformation. Skin tends to stretch smoothly up to a point and then buckle nonlinearly into wrinkles. Furthermore, relating blend shapes to motion capture data is a non-trivial task.

Physically based simulation models use underlying biomechanical behavior of the human face to create realistic facial animations. Certain prior art techniques have determined individual muscle activations from sparse motion capture data using an anatomical model of the actor. Synthesizing detailed animations from such performance capture data would require very detailed models of facial structure and musculature, which are difficult to accurately reconstruct for a specific performer.

Thus, while prior art techniques may be suitable for certain situations and applications, they have exhibited limitations for creating realistic virtual faces, including for capturing textures, geometry, and facial motion of real people. What is needed therefore are new techniques that more accurately model and reproduce natural looking facial movements.

SUMMARY

The present disclosure is directed to novel techniques/methods/systems addressing and remedying the limitations noted previously for the prior art. Embodiments of the present disclosure can provide for acquisition, modeling, compression, and synthesis of realistic facial deformations using polynomial displacement maps. These techniques/methods/systems can make use of and include an analysis phase where the relationship between motion capture markers and detailed facial geometry is inferred, and a synthesis phase where detailed animated facial geometry is driven solely by a sparse set of motion capture markers.

An aspect of the present disclosure is directed to methods including an analysis phase for subsequent use in generating realistic facial movements. For such analysis, an actor can be visually recorded while wearing facial markers and performing a set of training expression clips. During the performance, real-time high-resolution facial deformations can be captured, including dynamic wrinkle and pore detail. The recording and capturing can utilize interleaved structured light 3D scanning and photometric stereo. Next, displacements can be computed between a neutral mesh driven by the motion capture markers and the high-resolution captured expressions. These geometric displacements are stored in one or more polynomial displacement maps ("PDMs"), which can be parameterized according to the local deformations of the motion capture dots as described in further detail in the following description. Additionally, generation or synthesis of realistic facial movement can be provided. For such synthesis, polynomial displacement map(s) can be driven with new motion capture data. This allows the recreation of large-scale muscle deformation, medium and fine wrinkles, and dynamic skin pore detail.

A further aspect of the present disclosure is directed to 3D facial deformation rendering systems including a central processing unit ("CPU"), a graphics processing unit ("GPU"), and a plurality of motion capture marker. The systems can be capable of analyzing and/or synthesizing facial deformations.

Another aspect of the present disclosure is directed to training data acquisition systems for real-time 3D image capturing. Such systems can include a stereo pair of high-resolution high-speed cameras. A high-speed digital light projection video projector can also be included. The high-speed cameras can be synchronized to the video projector, and the video projector can output a plurality of grayscale sinusoidal structured light patterns. A spherical gradient illumination device can be included, which can from the stereo camera pair and the structured illumination, calculate or configure a base geometry. The systems can also include a plurality of motion capture markers for placement on the face of an actor. The plurality of motion capture markers can allow each frame of motion to be registered in a common texture space.

Moreover, embodiments of the present disclosure can be implemented in computer-readable medium (e.g., hardware, software, firmware, or any combinations of such), and can be distributed over one or more networks. Steps described herein, including processing functions to derive, learn, or calculate formula and/or mathematical models utilized and/or produced by the embodiments of the present disclosure, can be processed by one or more suitable processors, e.g., central processing units ("CPUs) and/or one or more graphics processing units ("GPUs") implementing suitable code/instructions.

While aspects of the present disclosure are described herein in connection with certain embodiments, it is noted that variations can be made by one with skill in the applicable arts within the spirit of the present disclosure and the scope of the appended claims.

BRIEF DESCRIPTION OF DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
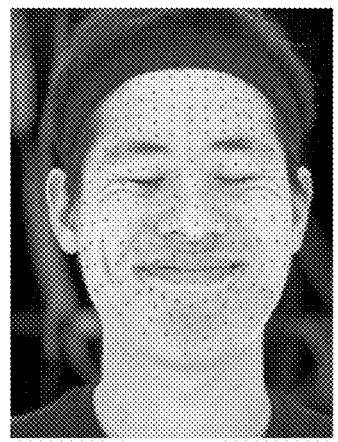
FIG. 1 includes five images depicting (a) an actor wearing facial motion capture markers arrayed in a grid, (b) a deformed neutral mesh based on the motion capture markers, (c) an addition of medium frequency displacement to the deformed neutral mesh, (d) an addition high frequency displacement to the deformed neutral mesh and medium frequency displacements, and (e) a ground truth geometry, in accordance with exemplary embodiments of the present disclosure.
Figure 1:
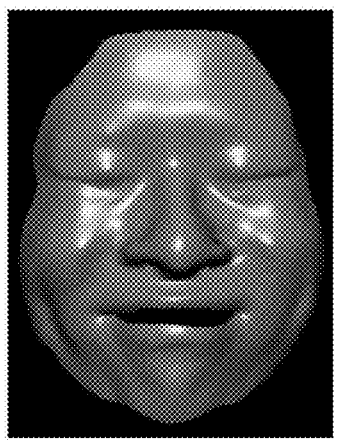
Figure 1:
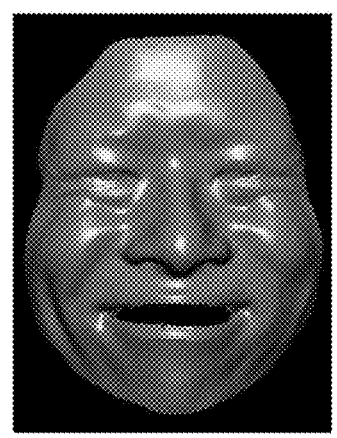
Figure 1:
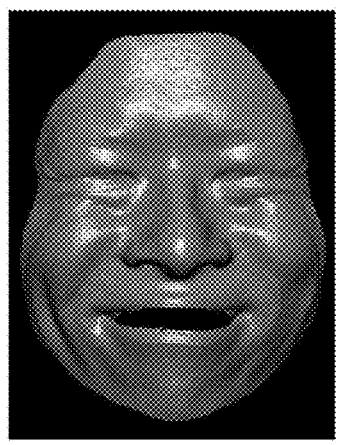
Figure 1:
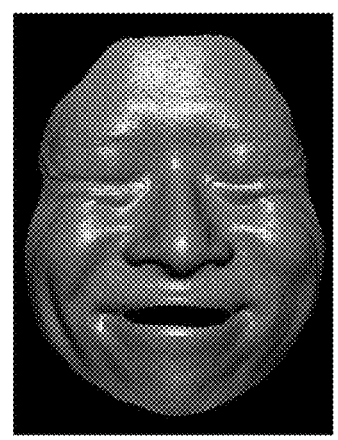

While certain embodiments depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

Aspects of the present disclosure are, in general terms, directed to methods and systems for modeling and/or synthesizing facial performances with realistic dynamic wrinkles and fine scale facial details. Embodiments of the present disclosure can utilize one or more of the following: (i) deformation-driven polynomial displacement maps, as a compact representation for facial deformations; (ii) novel real-time acquisition systems for acquiring highly detailed geometry based on structured light and photometric stereo; and (iii) novel methods that are able to generate highly detailed facial geometry from motion capture marker locations making use of PDMs describing the subject's appearance.

In exemplary embodiments, a real-time 3D scanning system can record training data of the high resolution geometry and appearance of an actor performing a small set of predetermined facial expressions. A set of motion capture markers can be placed on the actor's face to track large scale deformations. These large scale deformations can be related to the deformations at finer scales. This relation can be represented compactly in the form of two of the previously-mentioned deformation-driven polynomial displacement maps ("PDMs"), encoding variations in medium-scale and fine-scale displacements for a face undergoing motion, as for example shown in FIG. 1, described infra.

Embodiments of the present disclosure can also include an acquisition system is capable of capturing high-resolution geometry of dynamic facial performances at a desired frame rate, e.g., at 30 fps. Not only wrinkles but also dynamic fine-scale pore detail can be captured. The acquired training data can be represented as a biquadratic polynomial function (a PDM), driven by a sparse set of motion capture markers positions. Such representations can be both compact and maintain the non-linear dynamics of the human face. Embodiments of methods/systems according to the present disclosure can utilize one or more sets of captured training expressions. The captured expressions do not have to be directly used during synthesis, but instead a compact representation can be used that encodes the non-linear behavior of the deformations as a function of motion capture marker positions; these compact representations can be deformation-driven polynomial displacement maps, as described in further detail below. Accordingly, methods/systems according to the present disclosure can be used for deriving accurate high-resolution animation from relatively sparse motion capture data that can be utilized for various applications, including the compression of existing performance data and the synthesis of new performances. Technique of the present disclosure can be independent of the underlying geometry capture system and can be used to automatically generate high-frequency wrinkle and pore details on top of many existing facial animation systems.

The deformation-driven PDMs utilized by embodiments of the present disclosure can use biquadratic polynomials stored as textures to model the data. Such deformation driven PDMs differ from polynomial texture maps ("PTMs") in three significant aspects. First, PDMs model geometric deformations instead of changes in scene radiance. Second, PTMs have never been driven by changes in geometry. Finally, unlike PTMs used to date, the utilized driving parameters (not just the coefficients) can vary over the image space to better model complex facial expressions. The PDM representation can accordingly yield a relatively compact model that allows synthesis of realistic medium-scale and fine-scale facial motion using coarse motion capture data.

Data Acquisition Setup

Embodiments of real-time 3D capture systems can use a combination of structured light and photometric stereo to obtain high-resolution face scans, and consists of a stereo pair of high-resolution high-speed cameras synchronized to a high-speed DLP video projector and a spherical gradient illumination device. In exemplary embodiments, multiple (e.g., six, etc.) grayscale sinusoidal structured light patterns at varying scales and a full-on pattern can be output by the high-speed video projector running at a desired frame rate, e.g., 360 frames per second. From the stereo camera pair and the structured illumination, a base geometry can be triangulated. After each structured light sequence, four gradient illumination patterns and an additional diffuse tracking pattern can be generated, e.g., with a spherical lighting apparatus for computing photometric normals. In an exemplary embodiment, 178 tracking dots were placed on an actor's face so that each frame of motion could be registered in a common texture space; the marker motion also served as the basis for the parameter space for facial detail synthesis. Two lower-resolution cameras were placed to the sides to assist with motion capture marker tracking. Further suitable 3D capture systems and techniques are shown and described in Applicant's co-owned U.S. patent application Ser. No. 12/105,141, entitled "Acquisition of Surface Normal Maps from Spherical Gradient Illumination" filed 17 Apr. 2008, the entire contents of which are incorporated herein by reference; and as also described in Ma et al., "Rapid Acquisition of specular and Diffuse Normal Maps form Polarized Spherical Gradient Illumination," University of Southern California, (2007), the entire contents of which are incorporated herein by reference.

Geometry Reduction

For geometry reconstruction, geometry can be triangulated based on camera-to-camera correspondences computed from the ratios of the sinusoidal structured light patterns to the full-on pattern. Photometric surface normals can be computed from the spherical gradient patterns and then the photometric normals can be used to add fine-scale detail to the base geometry. This allows details such as dynamic wrinkles and fine-scale stretching and compression of skin pores to be captured in real-time.

Because the gradient illumination patterns are captured at different points in time, subject motion can be corrected for using an optical algorithm flow, e.g., the optical flow algorithm of Brox et al. [2004]. This flow can be computed between the first gradient pattern and the tracking pattern, and then this flow can be used to warp the four gradient-lit images to the same point in time. This allows for accurate calculation of surface normals using ratios of the gradient-lit images. Compensation for motion in the structured light patterns is not necessarily performed because the optical flow would lose stereo correspondences. However, slight errors due to motion in the structured light geometry are acceptable, since it is refined by the photometric normals afterwards, which corrects for these errors.

Figure 6:
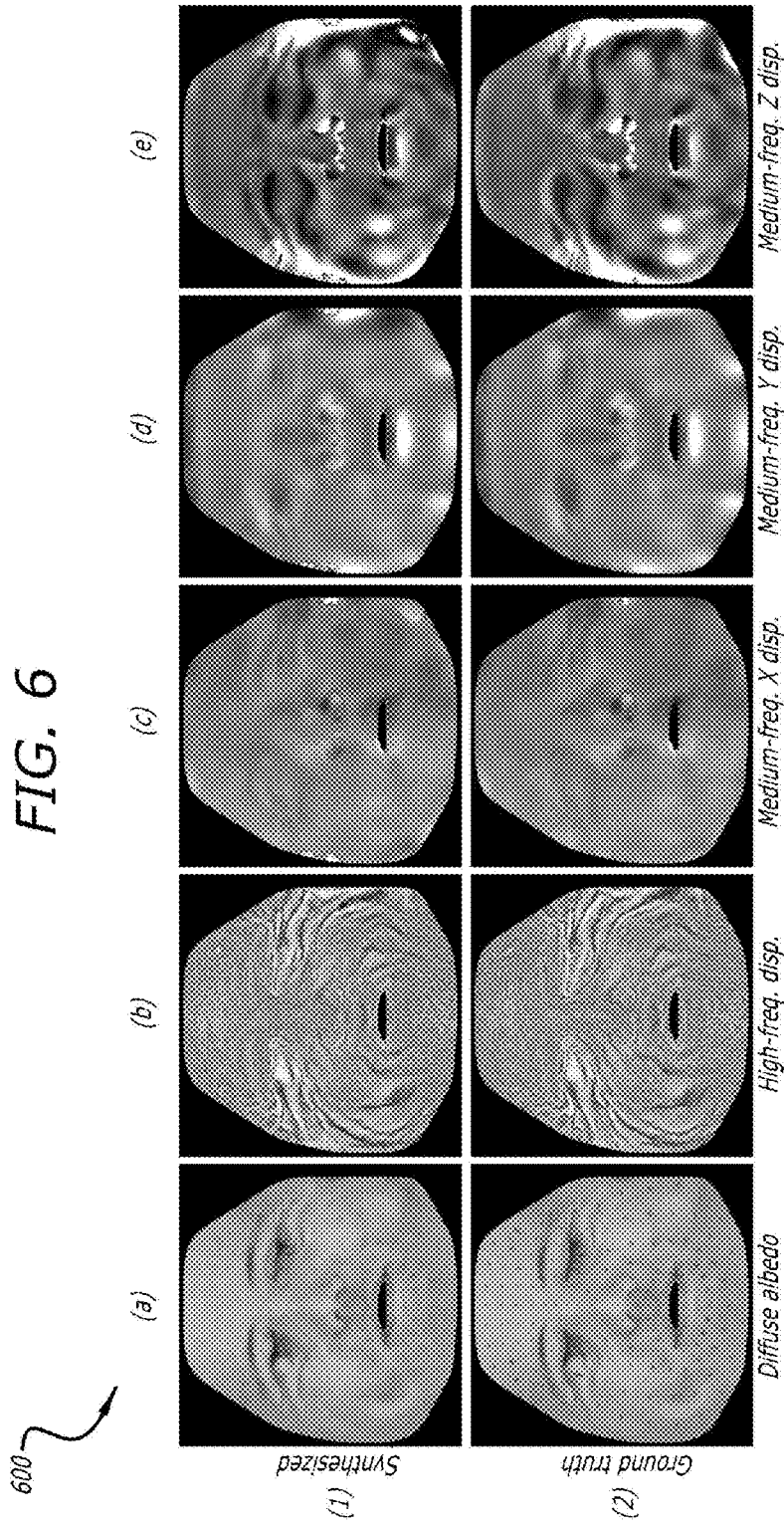
FIG. 6 depicts a comparison 600 of synthesized (row 1) and ground truth (row 2) albedo map and medium-frequency and high-frequency displacement map components (columns a-e) for the "happy" expression, in accordance with exemplary embodiments of the present disclosure.

The complete set of 3D training models can be registered to a common texture space determined by the motion capture tracking dots to achieve the initial alignment. The optical flow algorithm can be re-used to achieve alignment at the level of fine-scale features. Facial skin is often lacking in high-frequency diffuse texture features needed for accurate traditional optical flow. Instead the fact that skin is rich in high-frequency geometric details such as pores, cracks, and wrinkles can be leveraged to achieve accurate optical flow. To do this, the computed normal maps can be integrated to derive fine-scale displacement maps per frame. FIG. 6 depicts a comparison 600 of synthesized (row 1) and ground truth (row 2) albedo map and medium-frequency and high-frequency displacement map components (columns a-e) for the "happy" expression, in accordance with exemplary embodiments of the present disclosure. As can be seen in the two leftmost columns of FIG. 6, these maps contain much more texture information than the original diffusely lit images. After this final warp, surface details become well aligned in a consistent texture space.

Training

Figure 3:
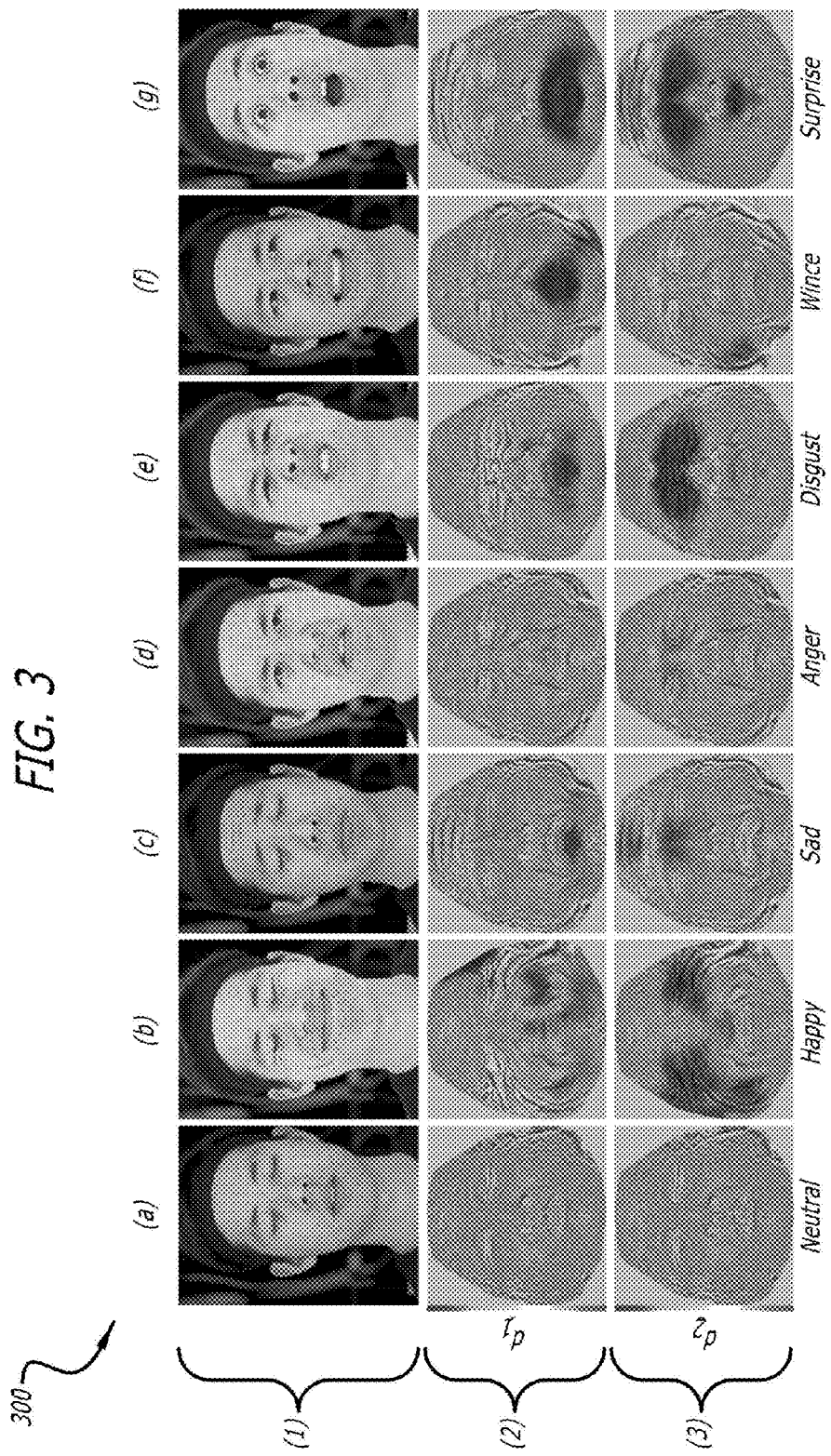
FIG. 3 is a collection of images, depicting an actor, wearing motion capture markers, in a neutral expression and expressing a number of identified emotions, along with corresponding calculated local displacement vectors, in accordance with an exemplary embodiment of the present disclosure.

To capture the range of facial deformation, several short sequences can be captured as the subject transitions from the neutral expression to various strong expressions such as those seen in the top row of FIG. 3.

In FIG. 3, a collection 300 of images, depicting an actor, wearing motion capture markers, in a neutral expression (row 1, column a) and expressing a number of identified strong emotions (row 1, columns b-g), along with corresponding calculated local displacement vectors (rows 2-3), in accordance with an exemplary embodiment of the present disclosure;

From each transition, a plurality of frames can be selected, e.g., between 10 and 30 frames, to use as input to the PDM fitting process, including the neutral start point, the extreme expression end points, as well as intermediate deformations. This can allow for the non-linear character of wrinkle formation and other fine-scale deformations to be modeled by the PDM.

Deformation-Driven Polynomial Displacement Maps

The use of deformation-driven PDMs in accordance with the present disclosure is based on the observation that medium-scale and fine-scale changes in surface shape correlate with larger-scale deformations in the corresponding facial region. For example, the formation of horizontal forehead wrinkles correlates with the larger-scale compression of the surface in a direction transverse to the wrinkles. Similarly, skin pores and fine wrinkles can become stretched or flattened according to the local stretching of the skin at coarser scales. Further detail of the development of PDMs to represent these deformations based on the high-resolution training data and tracked motion capture markers is described below.

The mathematical form of deformation-driven PDMs is as follows:

The mathematical form of deformation-driven PDMs is as follows:

$$D_{u,v}(d_1 d_2) = a_0(u,v) d_1^2 + a_1(u,v) d_2^2 + a_2(u,v) d_1 d_2 + a_3(u,v) d_1 + a_4(u,v) d_2 + a_5(u,v) \qquad (1)$$

In Eq. 1, $D_{u,v}$ is the local displacement at point (u,v), and $d_1$ and $d_2$ are measures of low-frequency deformation evaluated at point (u,v). The measurement of large-scale deformation is limited in Eq. 1 to the two dimensions d1 and d2 in order to keep the number of PDM coefficients as small as possible. A method, according to exemplary embodiments, for computing the best 2D parameterization of large-scale deformation is described below.

Figure 2:
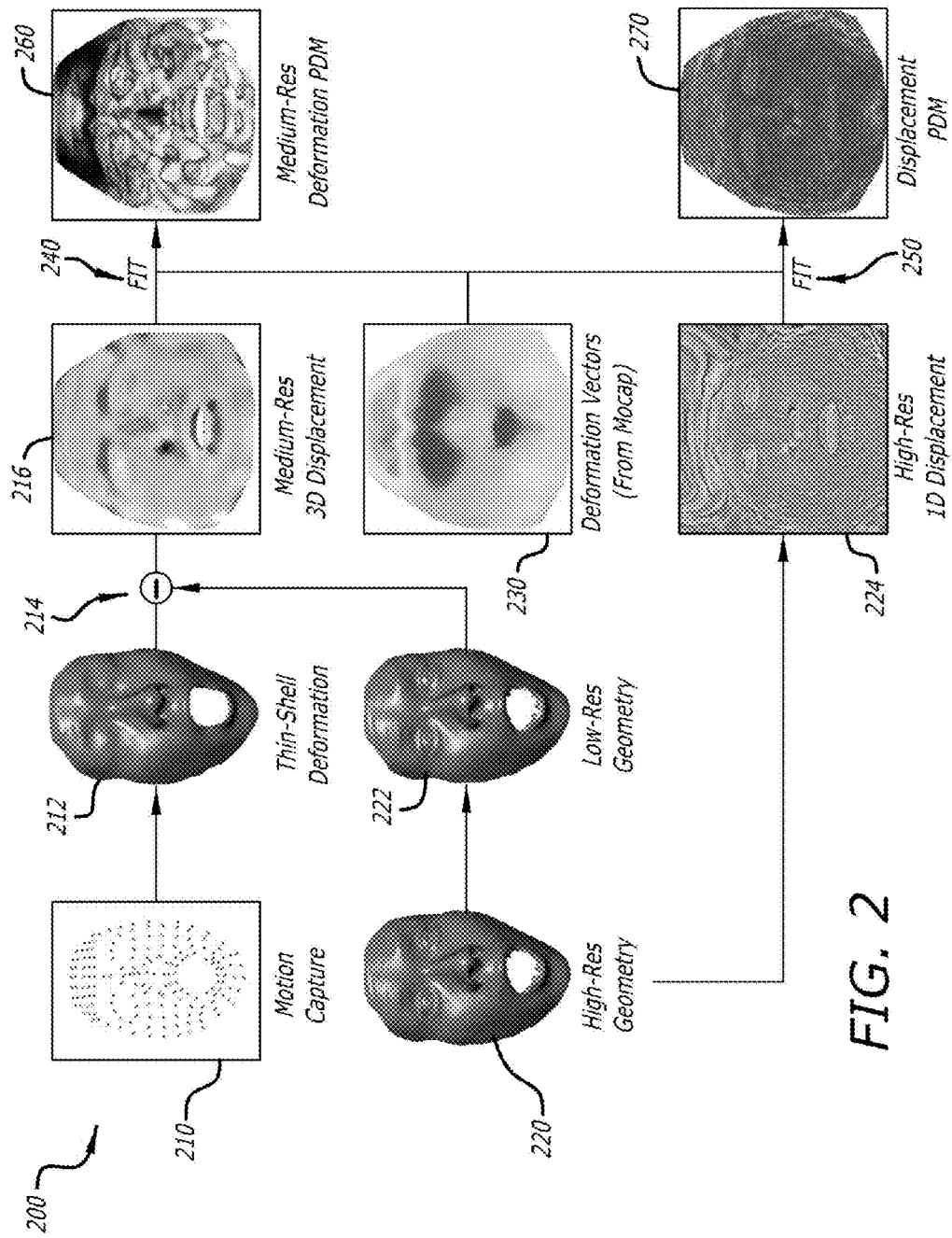
FIG. 2 depicts a flow diagram of a process for computing PDMs as part of a training analysis, in accordance with exemplary embodiments of the present disclosure.

An example of computing PDMs based on the captured training set of motion sequences is illustrated in FIG. 2. In the drawing, an optical flow or method 200 is depicted. Displacements D can be expressed relative to the motion of a low-resolution base mesh 210. This base mesh 210 can be derived using a linear thin shell interpolation technique to deform 212 a neutral mesh to the basic shape of the current expression, e.g., as in [Bickel et al. 2007]. However, rather than applying the thin shell deformation to a detailed neutral mesh, a smooth neutral mesh can instead be deformed. Differences between the deformed neutral mesh and the sequences of high-resolution scans 220 can then be encoded using the deformation-driven PDMs 260 and 270. This can significantly reduces the data compared to the original scans as the model becomes a single smooth neutral mesh and a set of deformation-driven PDMs.

With continued reference to FIG. 2, trying to fit both the medium-scale and fine-scale facial dynamics to a single deformation-driven PDM can attenuate fine-scale detail to better fit the medium-scale displacements. For this reason, a combination of two PDMs 260 and 270 are utilized in exemplary embodiments: one 260 for medium-scale deformations of several millimeters and a second one 270 for fine-scale deformations on the order of one millimeter. A medium-scale deformation-driven PDM can be fit (at 240) to the 3D scans, and then a fine-scale deformation-driven PDM can be fit (at 250) to a high-pass filtered version of the residual. This process can also reduce storage, since the medium-scale displacements can be computed at a lower resolution than the fine-scale displacements, and since the fine-scale displacements need only be computed in the 1D direction 224 normal to the mesh. The details of the fitting process are described below.

Scaled to the same resolution, these separately fit deformation-driven PDMs can be combined back into a single deformation-driven PDM by simply adding their respective coefficients. In practice, however, the medium-scale PDM can be applied to the geometric vertices and the evaluated fine-scale PDM can be used for a graphics processing unit ("GPU") displacement mapping.

Parameterizing Low Frequency Deformation

To generate and make use of PDMs, an input parameter space is created to characterizes local coarse-scale facial motion in a well-conditioned manner. To generate these parameters, a coarse triangle mesh can first be created over the set of motion markers. At each vertex $V_i$ of this coarse mesh, the low-frequency deformation at time t can be defined as $S_i(t)$ by conjoining the 3D positional offset $O_i(t)$ of the vertex with two additional values $E_i^u(t)$ and $E_i^v(t)$ representing the large-scale in-plane strain of the surface. This forms a 5D deformation space:

$$S_i(t) = \{O_i(t), E_i^u(t), E_i^v(t)\}.$$

The vertex position offsets $O_i(t)$ are computed by first applying a rigid transformation R to the coarse mesh to best match the neutral pose, thereby correcting for overall head pose. $O_i(t)$ is then simply the difference between the transformed vertex position $R(P_i(t))$ and the neutral vertex position $P_i^{ref}$.

The large-scale strains $E^u$ and $E^v$ can be estimated from the coarse mesh vertex positions of all vertices $N_2(V_i)$ connected to $V_i$ by a path of two or fewer edges. The positions of $N_2(V_i)$ can be projected into the local texture coordinate system (u,v). The 2D strain can be approximated as the difference between the standard deviation of the projected positions $P_j$ of $V_j \in N_2(V_i)$ in the current deformation and the standard deviation in the reference neutral expression:

$$E_i^u(t) = \sigma\{\hat{u} \cdot P_j(t)\} - \sigma\{\hat{u} \cdot P_j^{ref}\},$$

$$E_i^v(t) = \sigma\{\hat{v} \cdot P_j(t)\} - \sigma\{\hat{v} \cdot P_j^{ref}\}, \qquad (2)$$

To find a suitable 2D parameterization for the PDM domain, principal components analysis (PCA) can be performed on the 5D deformation vectors $S_i$ over all captured deformations. This determines the most important axes of large scale shape variation in the neighborhood of $V_i$. Prior to PCA, the strain values ($E_i^u, E_i^v$) can be scaled by $\sqrt{|N_2(V_i)|}$ to account for the lower noise of this aggregate measure relative to the noise in the single measurement $O_i$. The principal components, e.g., $\hat{Q}_i$ and $\hat{R}_i$, can be selected. For this, the present inventors found that the eigenvalues decreased very quickly after the first two, indicating most of the variation in S could be well captured by two principal components, e.g., validating a choice to use only a two-dimensional PDM parameterization. Examples of eigenvalues, averaged across the face are shown in Table 1. This analysis shows that most of the eigenvalues at each motion capture marker decay quickly. By choosing the best two dimensions for each motion capture marker, over 90% of the training data can be modeled.

TABLE 1

Energy averaged across the face represented by a subset of eigenvectors of the 5D deformation vectors, showing that two eigenvectors can model over 90% of the training data.

| | Eigenvectors | | | | |
|---|---|---|---|---|---|
| | 1 | 2 | 3 | 4 | 5 |
| Energy | 76.84% | 92.52% | 98.46% | 99.76% | 100% |

Finally, the final PDM domain axes can be derived over the coarse mesh by a smoothing process which assures the deformation bases of adjacent vertices do not differ excessively.

This can be accomplished by comparing each basis vector to the average of the corresponding basis vectors at adjacent vertices. Then the worst case outlier vector is successively replaced over the entire mesh with the average of the adjacent basis vectors. These vectors are reorthogonalized and renormalized at each step. This process is repeated until the worst case outlier lies within a threshold angle of the neighborhood-averaged vector. Denoting the result of smoothing $\hat{Q}_i$ and $\hat{R}_i$ by $\hat{q}_i$ and $\hat{r}_i$, the input parameters to the PDM at the coarse mesh vertex $V_i$ at time t are then simply:

$$d_1(P_i,t)=E_i(t)\cdot\hat{q}_i,$$

$$d_2(P_i,t)=E_i(t)\cdot\hat{r}_i, \quad (3)$$

To extend these deformation values over the entire mesh, E, $\hat{q}$, and $\hat{r}$ can be interpolated from their values at the vertices V using barycentric interpolation over the coarse triangle mesh.

The choice to include the vertex offsets $O_i$ themselves in the deformation vector is perhaps counterintuitive, as mechanical properties are typically invariant with respect to simple translation. It has been found by the present inventors, however, that local shape deformation correlates significantly with these vertex offsets. This is believed to be due to the strong influence of the underlying bone structure on the skin deformation. For example, it is expected that a skin patch under a fixed strain will nonetheless change shape as it slides over different bony facial features. The thin shell model does not account for such effects, and they therefore are preferably accounted for by the PDM.

Figure 4:
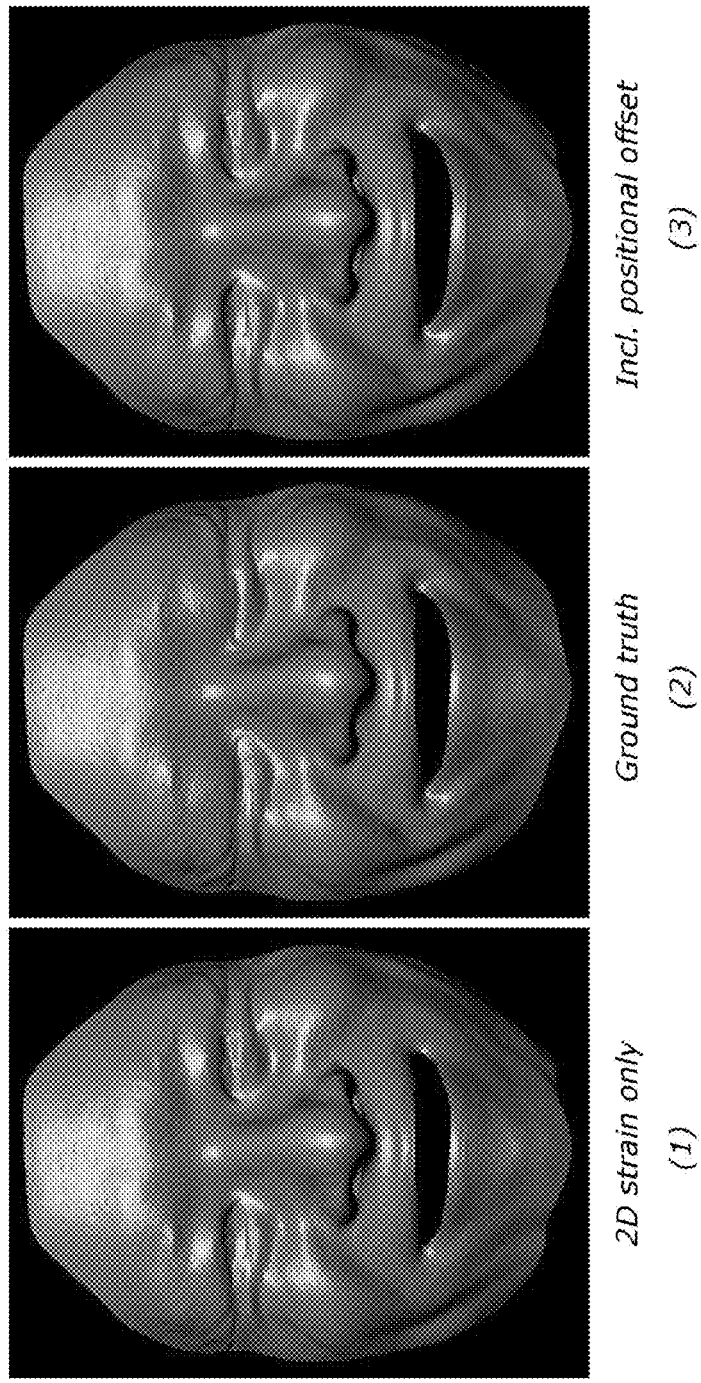
FIG. 4 depicts three images showing a comparison of PDM results with and without positional offsets included in the deformation metric and a ground truth model.

FIG. 4 shows a visual comparison 400 between a mesh synthesized using the results of a 5D PCA and a mesh using just the two dimensions of principle strain. While the differences can be subtle, they are perceptually important and most notable in dynamic sequences. The inclusion of vertex offsets generates particular improvement in the shape of the mouth and lower jaw. Compared to only using 2D strain (without the positional offsets $O_i$), the 5D PCA does not require any extra storage, adds only a limited amount of preprocessing, and results in lower errors.

An absolute strain formulation for E was used rather than the more traditional relative strain because the units of absolute strain are distance, which facilitates common analysis with the positional offsets $O_i$. In addition, bending and shear strains were neglected in the described implementation/embodiment(s). Over the restricted domain of facial motion, the five dimensions that were analyzed can function as effective proxies for the omitted dimensions. Examples of $d_1$ and $d_2$ evaluated over the face for different facial expressions can be seen in FIG. 3.

Optimal Fitting of Deformation-Driven PDMS

Optimal polynomial coefficients for EQ. 1 can be calculated at each texture point using the measured displacement values and the derived deformation input parameters. Given the sequence of measured displacement coordinate values $f_t$ at a point, the PDM coefficients can computed as the least-squares solution to the equations:

$$\begin{vmatrix} d_{11}^2 & d_{21}^2 & d_{11}d_{21} & d_{11} & d_{21} & 1 \\ \vdots & \vdots & \vdots & \vdots & \vdots & \vdots \\ d_{1t}^2 & d_{2t}^2 & d_{1t}d_{2t} & d_{1t} & d_{2t} & 1 \\ \frac{\gamma}{\sigma_{\hat{q}}^2} & 0 & 0 & 0 & 0 & 0 \\ 0 & \frac{\gamma}{\sigma_{\hat{r}}^2} & 0 & 0 & 0 & 0 \\ 0 & 0 & \frac{\gamma}{\sigma_{\hat{q}}\sigma_{\hat{r}}} & 0 & 0 & 0 \\ 0 & 0 & 0 & \frac{\gamma}{\sigma_{\hat{q}}} & 0 & 0 \\ 0 & 0 & 0 & 0 & \frac{\gamma}{\sigma_{\hat{r}}} & 0 \end{vmatrix} \begin{vmatrix} a_0 \\ a_1 \\ a_2 \\ a_3 \\ a_4 \\ a_5 \end{vmatrix} = \begin{vmatrix} f_1 \\ \vdots \\ f_t \\ 0 \\ 0 \\ 0 \\ 0 \\ 0 \end{vmatrix}$$

Regularization terms can be included to account for the possibility that one or both of the input parameters may not have exhibited sufficient variation in the training set, which could make recovery of the non-constant coefficients of the PDM unstable. It was found by the inventors that the regularization was effective for low values of the regularization constant γ, such that no degradation in the fidelity of the fitting was noticeable.

In exemplary embodiments, two deformation-driven PDMs can be recovered for each subject: one for medium-scale 3D displacement, e.g., at 512×512 pixel resolution, and one for fine-scale 1D displacement normal to the mesh, e.g., at 1024×1024 resolution. For the medium-scale displacement, each coordinate of displacement can be fit independently, yielding 18 total PDM coefficients. A deformation-driven PTM can be fit to the time-varying diffuse albedo measurements, yielding an additional 18 PTM coefficients.

Effect of PDM Order on Accuracy

Figure 5:
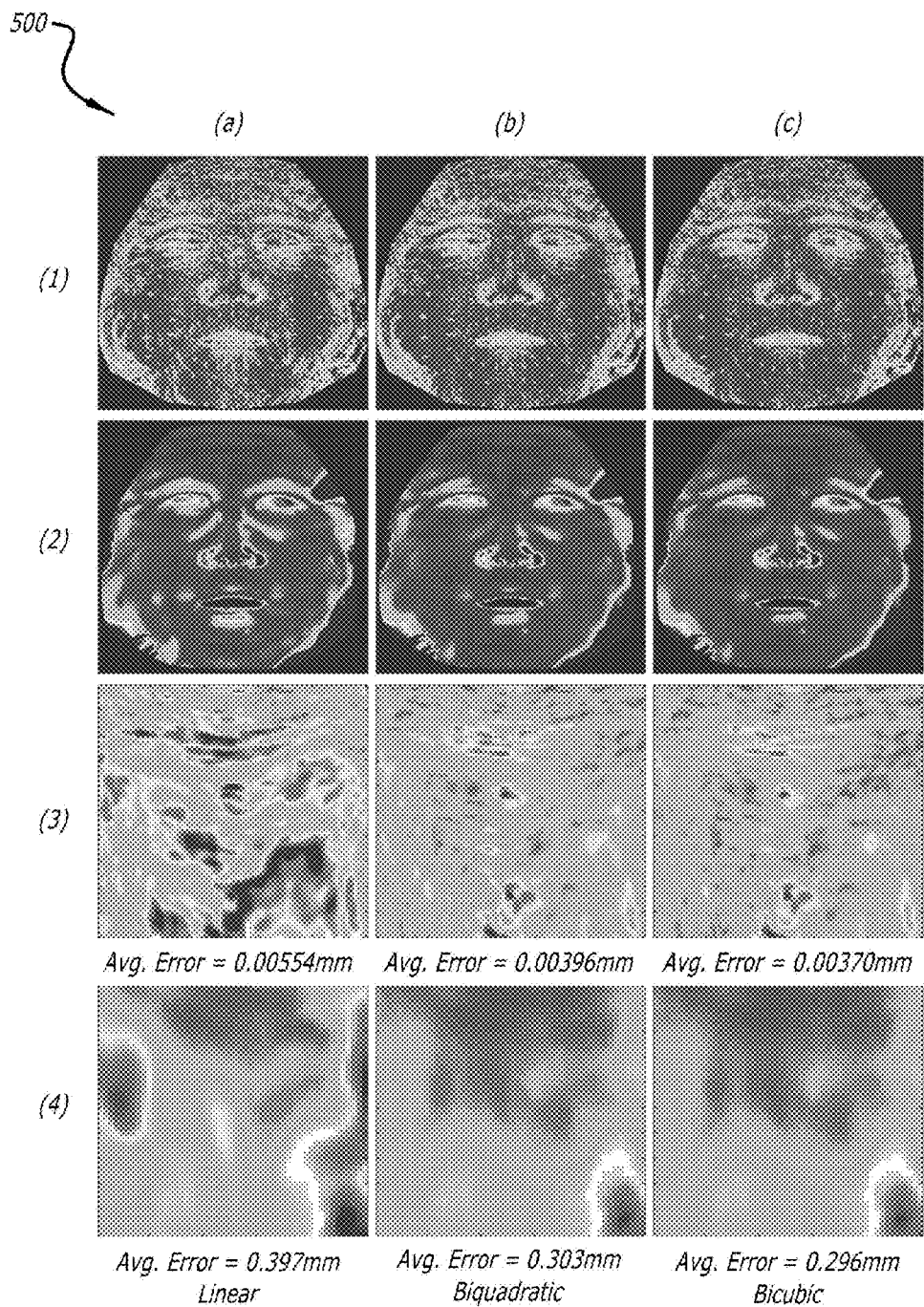
FIG. 5 depicts fitting errors for displacement maps for linear, biquadratic, and bicubic modeling, respectively.

A comparison was made of the results using biquadratic PDMs with those obtainable from linear PDMs and bicubic PDMs. An error comparison 500 for these different cases (columns a-c) are shown in FIG. 5. Although the linear PDMs perform well for much of the face, there are a number of areas where the benefit of biquadratic PDMs can be easily seen. While biquadratic polynomials cannot entirely fit the training data precisely (it represents a vast reduction in data), most of the perceptually important aspects of skin deformation are modeled effectively. Bicubic PDMs and higher-degree polynomials do not capture much more information and require substantially more storage (e.g., 10 coefficients per data channel rather than 6). Furthermore, higher order approximations also carry the danger of over-fitting the data.

Motion Synthesis

Once training data has been captured and deformation-driven PDMs have been derived, highly detailed models can be synthesized according to a performance recorded with standard facial motion capture. In this work, the same markers used in the training sequences can be used to record novel facial performances not in the training set. This makes synthesis and rendering of detailed facial geometry for each frame a straightforward process:

1. Deform the low-resolution neutral mesh to the motion capture points using linear thin shell interpolation.
2. Evaluate the deformation vector S and the deformation axes $\hat{d}_1$ and $\hat{d}_2$ over the motion capture points.
3. Interpolate the deformation axes and deformation vectors over the mesh texture space, forming the dot products $d_1$ and $d_2$ at each surface point.

4. Evaluate the medium-scale deformation-driven PDM and deform the mesh vertices according to the computed 3D offsets.
5. Evaluate the fine-scale deformation-driven PDM to form a 1D displacement map.
6. Render the deformed geometry and displacement map on the GPU.

Off-Line and Real-Time Rendering Systems

For embodiments providing for off-line rendering, steps 1-5, supra, can be performed on/with a suitable CPU. For embodiments providing for real-time rendering, the linear thin shell mesh can be generated on/with a CPU with a reduced vertex count, e.g., one of 10 k (versus 200 k for the off-line rendering system), to maintain/facilitate a frame rate of 20+ fps; a suitable system can include an Intel Pentium 4 Xeon and an nVidia 8800GTS. Next, the two PDMs can be evaluated using the GPU and the displacement can be added to the thin shell mesh. Examples of synthesized displacement maps, as well as a synthesized diffuse albedo map, can be seen in FIG. 6. Rendered results, discussed below, can be seen in FIG. 8.

Marker Placement

In practice, the performance data can be captured as desired, e.g., at a different time than the training data. Consequently, this could involve a new application of the motion capture markers. One industry-standard technique for obtaining maximally consistent marker placements uses a thin plastic mold of the actor's face with small holes drilled into it to guide the marker placement, usually to within a millimeter of repeatability. Accommodating marker placements with greater deviation could require a remapping step to evaluate the PDM as follows: First, the new motion capture markers (observed in a neutral position) can be mapped onto the neutral mesh acquired during training. Second, if the density of motion capture markers is different, it is preferable to scale the values $E_i''(t)$ and $E_i'''(t)$ accordingly. Because such mappings and corrections can involve some error, optimal results may be obtained from using approximately the same marker locations during performance capture and training.

Results from an Exemplary Embodiment

For a demonstration of exemplary embodiments, facial performances were captured (recorded) of two subjects. For each subject, the six training expressions shown in FIG. 3 were captured. In choosing the captured expressions, a focus was made on the inner and outer motion of the brow, motion of the mouth corners, nose wrinkling, cheek dimpling, brow furrowing, and basic jaw movement.

Several facial performances for each subject were then captured. Although the idea is that these performances need only consist of motion capture marker motion, real-time high resolution face scans were continuously acquired to serve as "ground truth" validation data for the synthesized sequences. The derived PDMs were used to reconstruct sequences that were part of the training set (e.g., FIG. 8, rows 1 and 3) as well as novel performances not of the training set (e.g., FIG. 8, rows 2 and 4). It was found that in both cases the synthesis algorithm produces results that are largely indistinguishable from the ground truth geometry sequences. Several of the performances contain significant global head motion, which did not appear to pose problems for model fitting.

Figure 8:
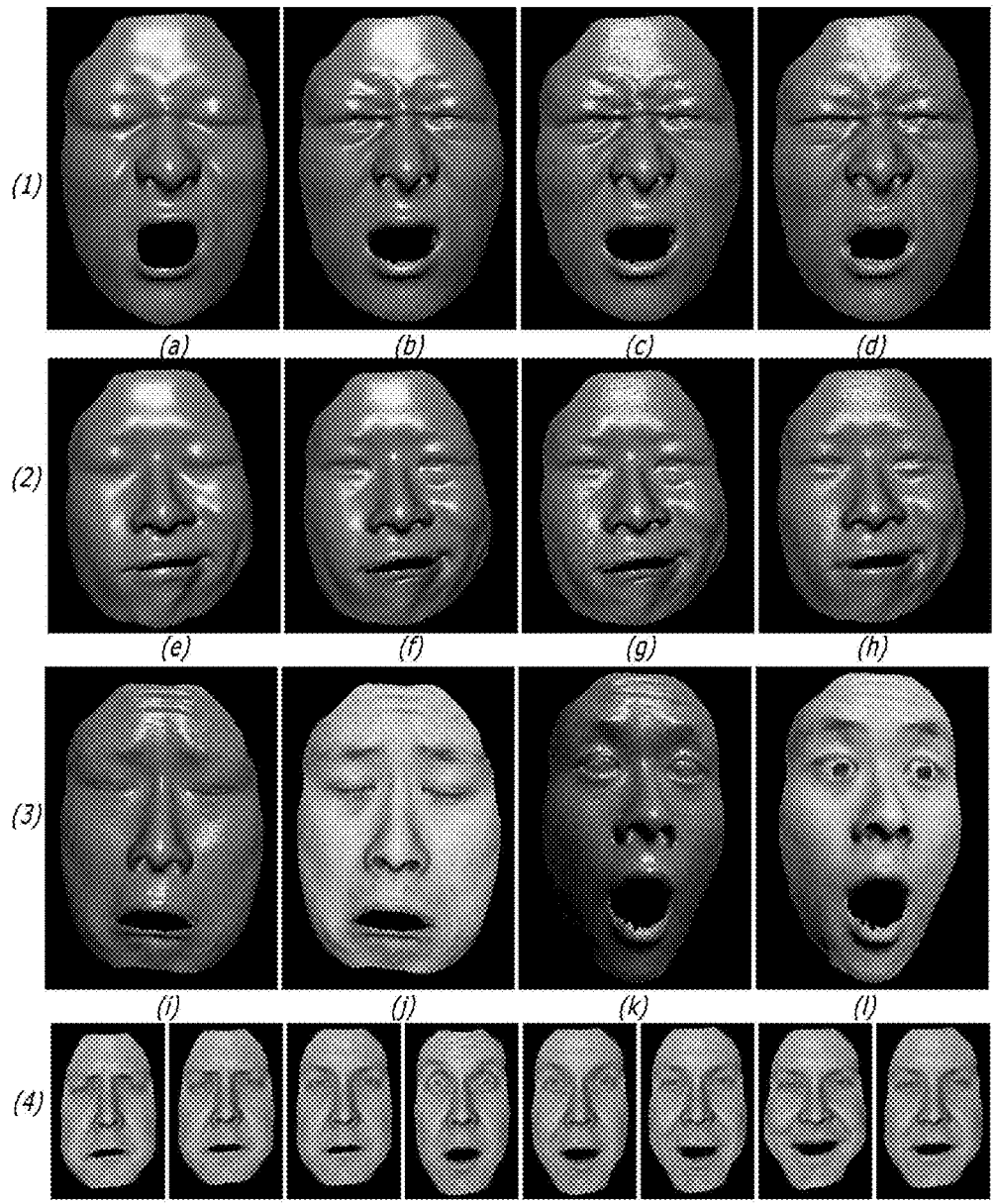
FIG. 8 includes a collection of images depicting results generated using deformation-driven PDMs and sparse motion capture points, in accordance with an exemplary embodiment of the present disclosure.

With continued reference to FIG. 8, the top two rows (1 and 2) show that while the thin-shell deformation model provides general face shape of the subject, it can fail to optimally reproduce medium-scale details such as brow ridges and facial musculature. The medium-scale PDMs add large wrinkles and definition to the brow. The fine-scale 1D PDM adds the remaining fine wrinkles and pore detail, making the synthesized model a close approximation of the ground truth.

Figure 7:
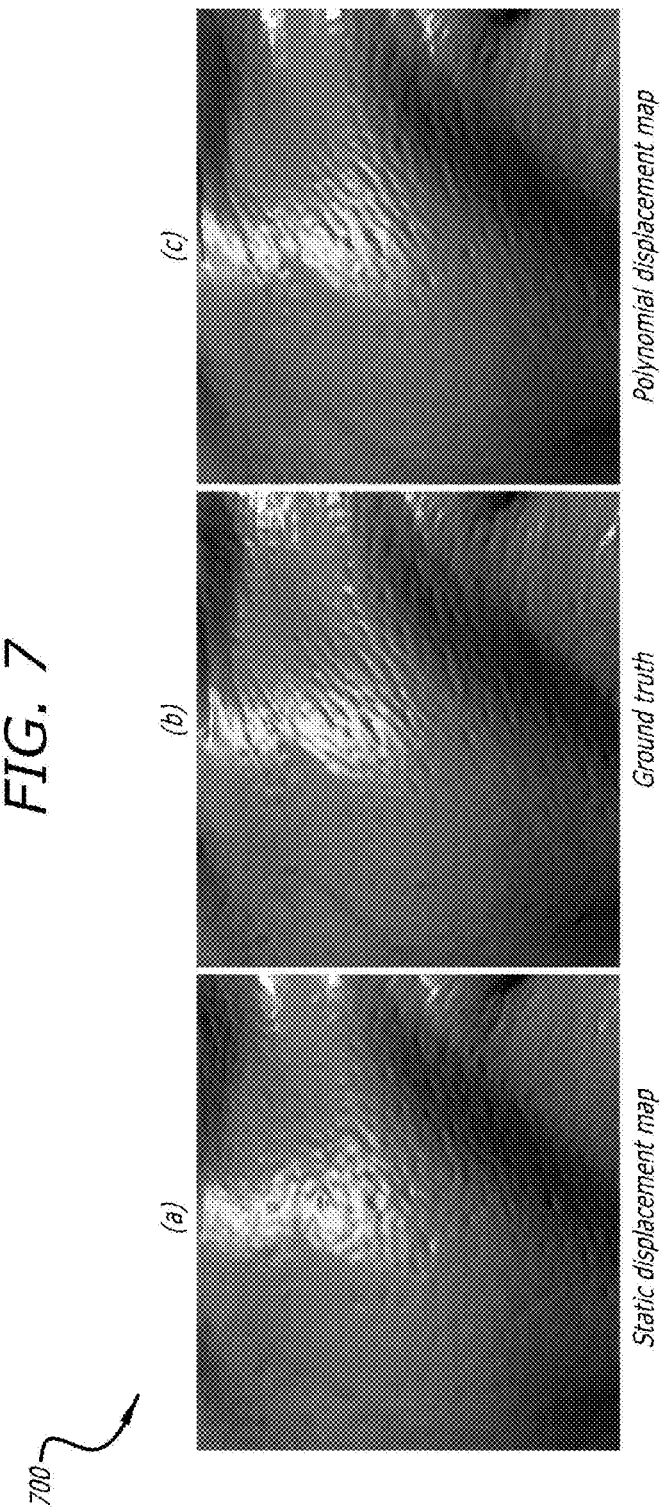
FIG. 7 includes three images depicting skin pore shapes for facial deformation and a comparison between a static displacement map, a ground truth image, and a polynomial displacement map in accordance with exemplary embodiments of the present disclosure.

FIG. 7 shows a comparison 700 of the effect of skin mesostructure deformation near the cheek for a "happy" expression. This deformation, seen in the ground truth geometry (b) and reproduced by the PDM in (a), can be seen as pore stretching across the cheek and the formation of a few fine-scale wrinkles below the eye. In contrast, mapping a static displacement map from the neutral expression to the "happy" geometry (c) does not reproduce these effects. These nonlinear changes in mesostructure may be important to synthesizing realistic expressions since they affect aspects of skin appearance.

FIG. 8 includes a collection 800 of images depicting results generated using deformation-driven PDMs and sparse motion capture points, in accordance with an exemplary embodiment of the present disclosure.

In designing the expression set, expressions were not broken down into individual facial action units. The fitting process inherently segments the captured data into usable sub expressions by choosing different PCA parameters for different facial regions (e.g., as in FIG. 3). To test this part of the algorithm, a new motion capture performance was captured, where the actor produced an asymmetric smile and raised a single eyebrow (FIG. 8, row 2). The synthesized geometry effectively combines elements from multiple training expressions to closely approximate the ground truth.

The low-frequency deformation parameters can also be used to model and synthesize other attributes such as facial reflectance. In addition to displacement, a three-channel PTM was fit to the dynamic surface reflectance recorded by the video cameras parameterized by the same facial deformation space. Semiautomatic dot removal was performed, e.g., as in [Guenter et al. 1998], to create a clean texture, though some black smudged remained in the images. The bottom two rows of FIG. 8 and the final examples in the video show results texture-mapped with synthesized PTMs. In these renderings, the PTMs successfully encode changes in surface shading due to self-occlusion. However, the eyes may not be fully realistic. This is because during training, the actor's eyes were not required to remain open or closed and as a result, the eyes can be assigned distorted texture containing both eyelid and eye color. In general, while this technique is successful at generating the shape and appearance for most of the face, realistically modeling the eyes and the skin immediately around them (as well as the inner mouth and lips) may require additional techniques. Additional polynomial texture maps could be used to model other skin properties such as changes in specularity and subsurface scattering caused by facial deformation.

Accordingly, deformation-driven polynomial displacement maps have been described and embodiments demonstrating their application in modeling and synthesizing dynamic high-resolution geometry for facial animation have been described. A high-resolution real-time 3D geometry acquisition system was built that is capable of capturing facial performances at the level of wrinkle and pore details. Furthermore, performance-driven polynomial displacement maps, a novel compact representation for facial deformation, was presented. This compact representation was demonstrated to provide a high level of visual fidelity, comparable to that achievable with hardware-intensive real-time scanning techniques.

Finally, the performance-driven PDMs were shown to be suited to synthesize new expressions that are not part of the original training dataset using only motion capture marker positions of the new facial expression. The techniques yield accurate reconstructions of medium-scale and fine-scale geometry over most of the face.

While certain embodiments have been described herein, it will be understood by one skilled in the art that the methods, systems, and apparatus of the present disclosure may be embodied in other specific forms without departing from the spirit thereof. For example, while PDMs have been described in the context of second-order or bi-quadratic equations, PDMs may be of different order, e.g., cubic, etc., within the scope of the present disclosure. Accordingly, the embodiments described herein, and as claimed in the attached claims, are to be considered in all respects as illustrative of the present disclosure and not restrictive.

What is claimed is:

1. A method of synthesizing realistic facial deformations for a computer graphics model of a face, including synthesizing fine-scale detail that includes skin wrinkling, the method comprising:
    (a) using a computer system, capturing data of the face, including one-dimensional fine-scale detail, for a plurality of different facial expressions;
    (b) using a computer system, learning the model of how the fine-scale detail observed in the data of (a) can be predicted from novel coarser-scale facial motion data based on the captured data of the face, including the fine-scale detail, for a plurality of different facial expressions, including deriving one or more deformation-driven polynomial displacement maps (PDMS) encoding displacements for a face undergoing motion; and
    (c) using a computer system, synthesizing fine-scale detail for the computer graphics model of the face based on the input of novel coarser-scale facial motion data using the learned model of (b), including the captured data of the face, including the fine-scale detail, for a plurality of different facial expressions.

2. The method of claim 1 wherein the synthesizing includes synthesizing detailed models according to a performance recorded with standard motion capture.

3. The method of claim 2, wherein the capturing comprises recording an actor wearing facial markers while performing a set of training expressions.

4. The method of claim 3, wherein the training expressions comprise a neutral expression and a plurality of strong expressions.

5. The method of claim 4, wherein the capturing comprises recording transitions in expression as the actor transitions from the neutral expression to one of the plurality of strong expressions.

6. The method of claim 5, further comprising for each transition selecting a plurality of frames for use as an input to the maps.

7. The method of claim 6, wherein the plurality of frames include a neutral starting point and a plurality of extreme expression end points.

8. The method of claim 7, wherein the plurality of frames comprise intermediate deformations.

9. The method of claim 2, wherein the deriving includes expressing displacements relative to a low-resolution base mesh.

10. The method of claim 9, further comprising deriving the base mesh using thin shell interpolation.

11. The method of claim 10, further comprising deforming a neutral mesh to the basic shape of an actor's expression.

12. The method of claim 2, wherein each PDM is calculated by a processor, and wherein the PDM is of the form:

$$D_{u,v}(d_1 d_2) = a_0(u,v)d_1^2 + a_1(u,v)d_2^2 + a_2(u,v)d_1 d_2 + a_3(u,v)d_1 + a_4(u,v)d_2 + a_5(u,v),$$

where $D_{u,v}$ is the local displacement at point (u,v), $d_1$ and $d_2$ are measures of low-frequency deformation evaluated at point (u,v), and $a_0$-$a_5$ are coefficients of the PDM whose values are computed so as to cause the PDM to reflect the model that is learned.

13. The method of claim 2, wherein the deriving further comprises generating an input parameter space that characterizes local course scale facial motion in a well conditioned manner.

14. The method of claim 13, further comprising creating a coarse triangular mesh over the set of motion markers.

15. The method of claim 14, further comprising defining low-frequency deformation at time t as $S_i(t)$ at each vertex of the course mesh.

16. The method of claim 15, wherein defining low-frequency deformation comprises conjoining 3D positional offset of the vertex with two additional values representing the large-scale in-plane strain of the surface.

17. The method of claim 16, wherein defining low-frequency deformation comprises forming a 5D deformation space of the following form:

$$S_i(t) = \{O_i(t), E_i^u(t), E_i^v(t)\},$$

where $O_i(t)$ is the 3D positional offset of the vertex, and $E_i^u(t)$ and $E_i^v(t)$ represent the large-scale in-plane strain of the surface in two directions.

18. The method of claim 17, wherein the vertex position offsets $O_i(t)$ are computed by applying a rigid transformation to the coarse mesh to match the neutral pose.

19. The method of claim 18, wherein $O_i(t)$ is calculated as the difference between the transformed vertex position and the neutral position.

20. The method of claim 17, wherein the large scale strains $E_i^u(t)$ and $E_i^v(t)$ are estimated from the course mesh vertex positions of all vertices connected to $V_i$ by a path of two or fewer edges.

21. The method of claim 20, wherein the course mesh vertex positions, $N_2(V_i)$, are projected into a local texture coordinate system (u,v).

22. The method of claim 21, further comprising approximating 2D strains as the difference between the standard deviation of the projected positions $P_j$ of $V_j \in N_2(V_i)$ in the current deformation and the standard deviation in the reference neutral expression, according to the following:

$$E_i^u(t) = \sigma\{\hat{u} \cdot P_j(t)\} - \sigma\{\hat{u} \cdot P_j^{ref}\} \text{ and } E_i^v(t) = \sigma\{\hat{v} \cdot P_j(t)\} - \sigma\{\hat{v} \cdot P_j^{ref}\}.$$

23. The method of claim 17, further comprising finding a suitable 2D parameterization of the PDM domain.

24. The method of claim 23, wherein finding a suitable 2D parameterization comprises performing principal component analysis on the 5D deformation over all captured deformations, wherein the two most important axes of large scale shape variation adjacent to $V_i$ are obtained.

25. The method of claim 24, further comprising deriving final PDM domain axes over the course mesh by a smoothing process that assures the deformation bases of adjacent vertices do not differ beyond a desired amount.

26. The method of claim 25, wherein the result of smoothing $\hat{Q}_i$ and $\hat{R}h_i$ is $\hat{q}_i$ and $\hat{r}_i$ and the input parameters to the PDM at the course mesh vertex $V_i$ at time t are equal to:

$$d_1(P_i,t)=E_i(t)\cdot\hat{q}_i,$$

$$d_2(P_i,t)=E_i(t)\cdot\hat{r}_i.$$

27. The method of claim 12, wherein given a sequence of measured displacement coordinate values $f_t$ at a point, the PDM coefficients are computed as the least-squares solution to the following system of equations:

$$\begin{vmatrix} d_{11}^2 & d_{21}^2 & d_{11}d_{21} & d_{11} & d_{21} & 1 \\ \vdots & \vdots & \vdots & \vdots & \vdots & \vdots \\ d_{1t}^2 & d_{2t}^2 & d_{1t}d_{2t} & d_{1t} & d_{2t} & 1 \\ \frac{\gamma}{\sigma_{\hat{q}}^2} & 0 & 0 & 0 & 0 & 0 \\ 0 & \frac{\gamma}{\sigma_{\hat{r}}^2} & 0 & 0 & 0 & 0 \\ 0 & 0 & \frac{\gamma}{\sigma_{\hat{q}}\sigma_{\hat{r}}} & 0 & 0 & 0 \\ 0 & 0 & 0 & \frac{\gamma}{\sigma_{\hat{q}}} & 0 & 0 \\ 0 & 0 & 0 & 0 & \frac{\gamma}{\sigma_{\hat{r}}} & 0 \end{vmatrix} \begin{vmatrix} a_0 \\ a_1 \\ a_2 \\ a_3 \\ a_4 \\ a_5 \end{vmatrix} = \begin{vmatrix} f_1 \\ \vdots \\ f_t \\ 0 \\ 0 \\ 0 \\ 0 \\ 0 \end{vmatrix}$$

28. The method of claim 12, wherein the synthesizing further comprises deforming the low-resolution neutral mesh to the motion capture points using linear thin shell interpolation.

29. The method of claim 28, further comprising evaluating the deformation vector S and the deformation axes $\hat{d}_1$ and $\hat{d}_2$ over the motion capture points.

30. The method of claim 28, further comprising interpolating the deformation axes and deformation vectors over the mesh texture space and forming the dot products $d_1$ and $d_2$ at each surface point.

31. The method of claim 28, further comprises evaluating the medium-scale deformation-driven PDM and deforming the mesh vertices according to the computed 3D offsets.

32. The method of claim 28, further comprising evaluating the fine-scale deformation-driven PDM to form a 1D displacement map.

33. The method of claim 28, further comprising rendering the deformed geometry and displacement map on the GPU.

34. The method of claim 1 further comprising:
deforming a low-resolution neutral mesh to motion capture points using linear thin shell interpolation;
evaluating a deformation vector S and deformation axes $\hat{d}_1$ and $\hat{d}_2$ over the motion capture points;
interpolating the deformation axes and deformation vectors over a mesh texture space, forming dot products $d_1$ and $d_2$ at each surface point;
evaluating a medium-scale deformation-driven PDM;
deforming vertices in the mesh according to computed 3D offsets;
evaluating a fine-scale deformation-driven PDM to form a 1D displacement map; and
rendering the deformed geometry and displacement map.

35. The method of claim 34, further comprising displaying a rendered image.

36. The method of claim 1, wherein each PDM is of the form:

$$D_{u,v}(d_1,d_2)=a_0(u,v)d_1^2+a_1(u,v)d_2^2+a_2(u,v)d_1d_2+a_3(u,v)d_1+a_4(u,v)d_2+a_5(u,v),$$

where $D_{u,v}$ is the local displacement at point (u,v), $d_1$ and $d_2$ are measures of low-frequency deformation evaluated at point (u,v), and $a_0$-$a_5$ are coefficients of the PDM whose values are computed so as to cause the PDM to reflect the model that is learned.

37. A computer-executable program product for rendering realistic facial deformations, the program product comprising a non-transitory computer-readable medium with resident computer-readable instructions, the computer readable instructions comprising instructions for:
(a) capturing data of a face including one-dimensional fine-scale detail for a plurality of facial expressions;
(b) learning a model of how the fine-scale detail observed in the data of (a) can be predicted from novel coarser-scale facial motion data based on the captured data of the face, including the fine-scale detail, for a plurality of different facial expressions, including deriving one or more deformation-driven polynomial displacement maps (PDMs) encoding displacements for a face undergoing motion; and
(c) synthesizing fine-scale detail for the computer graphics model of the face based on the input of novel coarser-scale facial motion data using the learned model of (b), including the captured data of the face, including the fine-scale detail, for a plurality of different facial expressions.

38. The program product of claim 37, wherein each PDM is of the form:

$$D_{u,v}(d_1,d_2)=a_0(u,v)d_1^2+a_1(u,v)d_2^2+a_2(u,v)d_1d_2+a_3(u,v)d_1+a_4(u,v)d_2+a_5(u,v)$$

where $D_{u,v}$ is the local displacement at point (u,v), $d_1$ and $d_2$ are measures of low-frequency deformation evaluated at point (u,v), and $a_0$-$a_5$ are coefficients of the PDM whose values are computed so as to cause the PDM to reflect the model that is learned.

* * * * *